UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION OF GERMANY.

ANTHRACENE COLORING-MATTER AND PROCESS OF PRODUCING THE SAME.

No. 796,393.     Specification of Letters Patent.     Patented Aug. 1, 1905.

Application filed April 1, 1905. Serial No. 253,349.

*To all whom it may concern:*

Be it known that I, OSCAR BALLY, doctor of philosophy and chemist, a citizen of the Swiss Republic, residing at Mannheim, in the Grand Duchy of Baden, German Empire, have invented new and useful Improvements in Anthracene Coloring-Matters and Processes of Producing the Same, of which the following is a specification.

My invention relates to the production of new coloring-matters of the anthracene series. The specification of the application for Letters Patent, Serial No. 243,571, describes an invention in which the production of new coloring-matters of the anthracene series is effected by heating with caustic alkali a compound containing a benzanthrone group. I have now discovered that by treating coloring-matters of this class with nitric acid or other nitrating agent with or without subsequent reduction—say with sodium sulfid—new and valuable coloring-matters can be obtained which, like the parent coloring-matters, dye vegetable fiber substantively from the hydrosulfite vat. The shades produced are from olive-green to blue-green, and, generally speaking, as the reaction of the nitrating agent is more energetic the new coloring-matters produce shades which are more yellowish green.

The new coloring-matters which I desire to claim generically are characterized by the following properties. They consist when dry of dark powders and are soluble in concentrated sulfuric acid yielding from green to violet-blue solutions. They are insoluble in water and in dilute acids and alkalies; but they are soluble in alkaline hydrosulfite solution giving from greenish-blue to blue colored vats which dye vegetable fiber shades which on exposure to the air become green.

The following examples will serve to further illustrate the nature of my invention, which, however, is not confined to these examples. The parts are by weight.

Example 1: Introduce ten (10) parts of the coloring-matter obtainable from benzanthrone-quinolin, as described in Example 1 of the aforesaid specification of the application for Letters Patent, Serial No. 243,571, into seventy-five (75) parts of nitric acid, (containing about eighty-seven (87) per cent. of $HNO_3$,) while maintaining the temperature under zero centigrade, ($0°$ C.) When no unaltered coloring-matter remains, pour the mixture onto ice and filter off and wash the precipitated coloring-matter, which when dry is a dark-green powder. The crude product is soluble in concentrated sulfuric acid, the solution being dull green. It is also soluble in boiling nitrobenzene, the solution being greenish blue. It is insoluble in water and in dilute acids and alkalies. On warming gently, however, with alkaline hydrosulfite, it dissolves, forming a greenish-blue vat which produces on vegetable fiber pure blue shades. On washing, these shades become yellowish green and are extremely fast.

Example 2: Suspend ten (10) parts of the coloring-matter obtainable from benzanthrone, as described in Example 3 of the aforesaid specification of the application for Letters Patent, Serial No. 243,571, in one hundred (100) parts of glacial acetic acid and add while well stirring and at ordinary temperature a mixture of thirty (30) parts of nitric acid, containing eighty-seven (87) per cent. of $HNO_3$, and sixty (60) parts of glacial acetic acid. Warm the mixture gently and stir for about twelve (12) hours at a temperature of sixty degrees centigrade, ($60°$ C.) Allow the mass to cool and then filter off the nitro compound and wash it first with glacial acetic acid and then with water and finally dry. The crude product is a dark powder which is insoluble in water and in dilute acids and alkalies. It is difficultly soluble in most organic solvents, but is fairly soluble in boiling nitrobenzene and can be crystallized from this solvent. With alkaline hydrosulfite it yields a blue vat which produces on vegetable fiber blue shades. These shades on washing become green and are extremely fast. The pure coloring-matter is soluble in concentrated sulfuric acid, the solution being blue-violet.

Example 3: Suspend ten (10) parts of the nitro compound obtainable as described in the foregoing Example 2 in six hundred (600) parts of a ten (10) per cent. sodium sulfid solution and heat the mass for about three (3) hours on the water-bath. Filter while hot and wash the residual coloring-matter with hot water until it is free from sodium sulfid. In the dry state it is a dark powder which is very similar in color to the nitro product from which it was obtained and can be dyed from a vat in the same manner. The chief difference between this compound and the parent nitro compound is that the reduction product is easily soluble in nitrobenzene, the solution being green.

Now what I claim is—

1. The process for the production of new coloring-matters of the anthracene series by treating with a nitrating agent a coloring-matter which can be obtained by acting with caustic alkali on a compound containing a benzanthrone group.

2. The process for the production of new coloring-matters of the anthracene series by treating with a nitrating agent and then reducing, a coloring-matter which can be obtained by acting with caustic alkali on a compound containing a benzanthrone group.

3. As new articles of manufacture the new coloring-matters of the anthracene series which can be obtained from a coloring-matter containing a benzanthrone group, which new coloring-matters consist of dark powders which are soluble in concentrated sulfuric acid yielding from green to violet-blue solutions, which are insoluble in water and in dilute acids and alkalies, which are soluble in alkaline hydrosulfite solution yielding from greenish-blue to blue vats which dye vegetable fiber shades which on exposure to the air become green.

4. As a new article of manufacture, the new coloring-matter which can be obtained by treating with nitric acid the coloring-matter which can be obtained by acting on benzanthrone-quinolin with caustic alkali, which new coloring-matter is a dark-green powder, soluble in concentrated sulfuric acid, which is soluble in boiling nitrobenzene the solution being greenish-blue, which is insoluble in water and in dilute acids and alkalies, and which is soluble in alkaline hydrosulfite solution yielding a greenish-blue vat which dyes vegetable fiber shades which on exposure to the air become yellowish-green.

In testimony whereof I have hereunto set my hand in the presence of two subscribing witnesses.

OSCAR BALLY.

Witnesses:
   J. ALEC. LLOYD,
   JOS. H. LEUTE.